C. MILLER.
SAW FILER AND SET.
APPLICATION FILED JAN. 22, 1910.
976,091.
Patented Nov. 15, 1910.
2 SHEETS—SHEET 1.
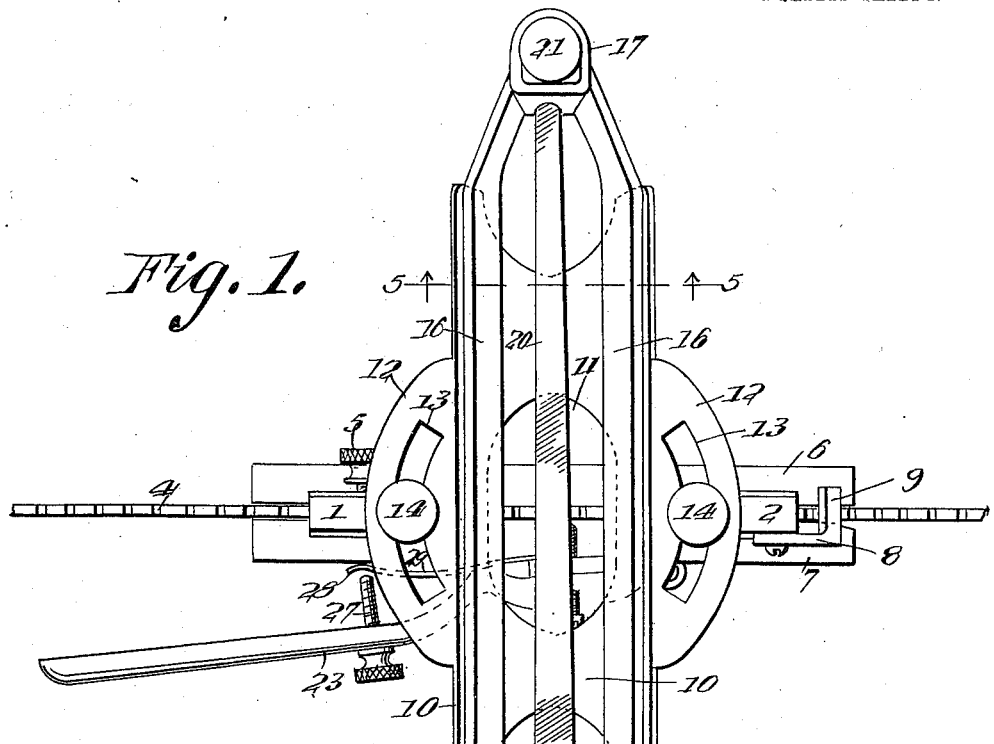
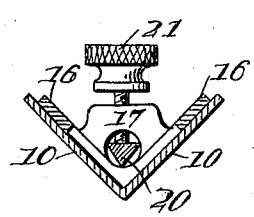

C. MILLER.
SAW FILER AND SET.
APPLICATION FILED JAN. 22, 1910.
976,091.
Patented Nov. 15, 1910.
2 SHEETS—SHEET 2.
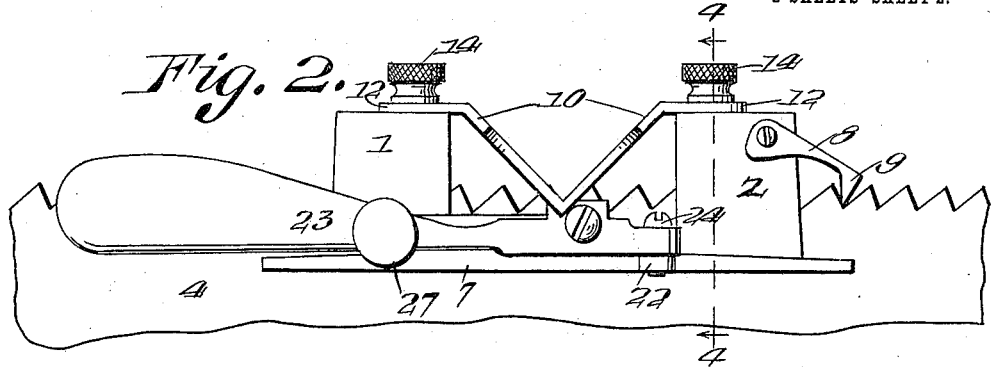
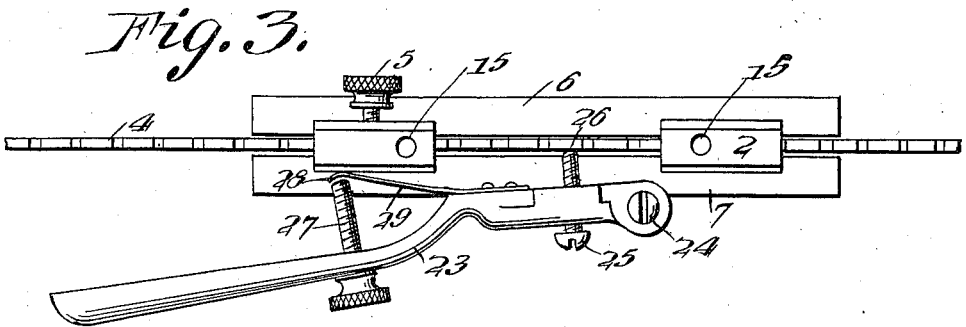
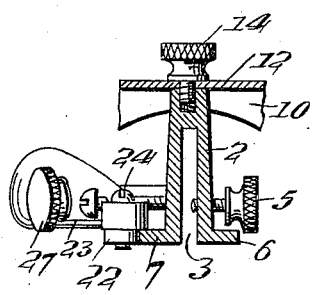
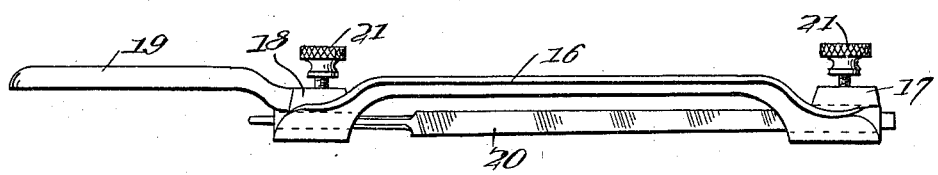
Witnesses
Ada C. Hagerty
Elsa B. Dana
Inventor
Cornelius Miller
by Joseph A. Miller
Attorney

UNITED STATES PATENT OFFICE.

CORNELIUS MILLER, OF PROVIDENCE, RHODE ISLAND.

SAW FILER AND SET.

976,091.  Specification of Letters Patent.  Patented Nov. 15, 1910.

Application filed January 22, 1910. Serial No. 539,540.

*To all whom it may concern:*

Be it known that I, CORNELIUS MILLER, a citizen of the United States, residing at Providence, in the county of Providence and State of Rhode Island, have invented a new and useful Improvement in Saw Filers and Sets, of which the following is a specification.

This invention relates to certain new and useful improvements in saw filers and sets, and the object of the invention is to provide a device of this type embodying in a simple and compact structure means for quickly and easily filing the saw teeth and then giving the same the required set.

A further object of the invention is to so construct and relate the parts, that the cut of the file may be adjusted both as regards depth and angularity with respect to the saw teeth, and one wherein the teeth may be set at the completion of the filing operation without bodily movement of the device.

Further and other objects will be later set forth.

In the drawings: Figure 1 is a top plan view of the device showing the same clamped to a fragment of a saw, Fig. 2 is a side elevation, Fig. 3 is a view similar to Fig. 1, but illustrating the file carrier guide and the file carrier itself removed, Fig. 4 is a section taken on the line 4 4 of Fig. 2, Fig. 5 is a similar view taken on the line 5—5 of Fig. 1, and Fig. 6 is a side elevation of the file carrier.

The invention as at present contemplated includes a supporting member which consists of two plates 1 and 2, which are slotted as at 3, so as to receive the saw 4, the plate 1 carrying a thumb screw 5, whereby the supporting member may be clamped rigidly to the saw blade. Connected to the lower ends of the plates 1 and 2 are longitudinal strips 6 and 7, which latter engage on opposite sides of the saw blade and amply provide against any lateral or transverse movement of the supporting member. A latch 8 is pivoted to the plate 2 and is formed at its end with a tooth 9 which drops into engagement with the saw teeth, progressively advancing the file to a new tooth of the saw when manual movement is given to the supporting member in a direction along the length of the saw.

The file carrier guide is composed of a plate 10, which is V-shape in cross section, and which is provided with a central opening 11, for a purpose to be later set forth. Each of the sides of the file carrier guide is formed with an integral outwardly extending wing 12, each wing being formed with an arc shaped slot 13 through which is passed a thumb screw 14, the thumb screw engaging in threaded openings 15, formed in the upper ends of the plates 1 and 2. By reference to Fig. 2 of the drawings, it will be seen that the wings 12 seat directly on the upper ends of the plates 1 and 2 and are clamped rigidly with relation thereto by means of the thumb screws 14. It will thus be further apparent that the file carrier guide may be adjusted in angular relation to the saw blade as desired, to allow of the saw teeth being given any desired or necessary bevel.

The file carrier is composed of a pair of spaced longitudinal guide members 16, which have their outer under faces arranged at an angle substantially the same as that defined by the sides of the V-shaped plate 10, in order that, as depicted in Fig. 5 of the drawings, the file carrier will receive a true accurate guiding movement from the guide composed of plate 10. The members 16 are connected at their ends by means of a perforated head 17 and a perforated tail 18, the head and tail having their lower ends of V-shape conformation in cross section as illustrated in Fig. 5. A handle member 19 is carried by the tail piece 18 in order that the file carrier may be suitably reciprocated in the filing operation. The file 20 has its ends passed through the perforation of the head and tail pieces, and is secured therein by means of set screws 21, which project through the head and tail pieces and clamp the file in the perforations thereof. It will be seen that the body portion of the file carrier is bowed, thus allowing the working edge of the file to be exposed in order to act on the saw, it being evident from Fig. 1 of the drawings that the lower working edge of the file operates in a central opening 11 of the plate 10.

The strip 7 of the supporting member is provided with an outwardly extending perforated lug 22 to which is pivoted on its upper face the setting member 23, which latter is composed of an arm which is pivoted at its inner end to the lug 22 by means of a screw 24, and is provided with a stout screw 25 which latter has its front end formed with a setting point 26, it being evident that the screw 25 which passes through a perforated opening in the setting member 23 can thus be adjusted so as to vary the extent of the set of the saw teeth, which adjustment is further obtained by a stop or limiting screw 27, which is passed through the setting member 23, and has its free inner end adapted to engage the curved outer end 28 of a flat spring 29, the latter being rigidly affixed to the setting member 23, and being adapted to have its curved end 28 abut the adjacent side of the plate 1. The purpose of the spring 29 is to not only automatically return the setting member to inoperative position at the completion of each operation of the setting member to effect a set of a saw tooth, but to also offer a certain amount of resistance to each movement of the setting member on its setting stroke, thereby precluding any undue jar or shock being imparted to the tooth, such as might prove injurious to the same. As this spring 29 serves to cushion the impact of the setting point 26 on the saw tooth, the latter will be gently but positively given its proper set.

In operation it will be understood that the supporting member is placed in its position with relation to the saw by projecting the blade of the latter in the slots of plates 1 and 2, the strips 6 and 7 thereby engaging on opposite sides of the saw blade, after which the thumb screw 5 is tightened to thereby rigidly sustain the supporting member in position. It will be obvious that the supporting member is adjusted so that the base of the file carrier guide determines the depth of the cut of the file. The file carrier is received in the file carrier guide composed of the plate 10, and is given a reciprocatory movement therein in an evident manner. By proper adjustment of the file carrier guide which is possible by unloosening of the thumb screw 14, the bevel to be imparted to the saw teeth may be determined, and by manipulation of one or both of the screws 25 or 27 the extent of set of the teeth can be readily determined. Fig. 1 of the drawings shows the setting member in normal inoperative position, while Fig. 3 of the drawings illustrates the setting member about to enter into the setting position showing the setting point 26 in engagement with one of the saw teeth. It will be further seen that since the saw setting point 25 underlies the file carrier and is arranged so as to be in setting position when the file is in filing position, the saw setting means can be immediately moved to effect the set of the saw teeth upon completion of the filing operation.

Having thus described my invention, I claim as new and desire to secure by Letters Patent;—

1. A saw filer including a supporting member for clamping to the saw, a guide member adjustably carried by the supporting member and including a plate of V-shape cross section having a central opening, and a file carrier having a member conformably received by said guide member arranged to slide in the guide member.

2. A saw filer including a supporting member formed of two spaced plates, each plate being slotted to receive the saw blade, a longitudinal strip on each side of the plates which connect the same and engage on opposite sides of the saw blade, a guide member for the file carrier, composed of a plate V-shape in cross section formed with outwardly extending wings having arc-shaped slots therein, the wings seating on top of the said plates, set screws which extend through said slots of the wings and into the tops of the said plates, and a file carrier conformably fitted to slide in said channel formed by said V-shape plate.

3. A saw file including a pair of spaced end plates, a file carrier guide composed of a plate having a substantially central V-shaped portion arranged in the space between said plates and outwardly extending wings which seat on top of said end plates, and means to adjustably secure said extended wings to said end plates.

4. A device of the character described, comprising spaced plates formed with slots to receive a saw blade, connecting means for said plates, means for clamping said plates to the blade, a guide member of substantially concave cross-section carried by said plates and formed with a central opening, a file, a carrier for the file mounted in the said guide member, the cutting face of the file being held above the lowest portion of the file guide by said carrier, a portion of the saw blade being adapted to extend upward through the opening formed in said guide member and be engaged by the file.

In testimony whereof I have signed my name to this specification in the presence of two subscribing witnesses.

CORNELIUS MILLER.

Witnesses:
 ADA E. HAGERTY,
 J. A. MILLER.